United States Patent [19]

Hartmann et al.

[11] 4,087,392

[45] May 2, 1978

[54] MANUFACTURE OF PRESSURE-SENSITIVE ADHESIVES

[75] Inventors: Heinrich Hartmann, Limburgerhof; Wolfgang Druschke, Dirmstein; Klaus Eisentraeger, Ludwigshafen; Helmut Mueller, Kaiserslautern, all of Germany

[73] Assignee: BASF Aktiengesellschaft, Ludwigshafen, Germany

[21] Appl. No.: 592,810

[22] Filed: Jul. 3, 1975

[30] Foreign Application Priority Data

Jul. 31, 1974 Germany .............. 2436873

[51] Int. Cl.$^2$ .............................. C08G 18/80
[52] U.S. Cl. ................... 260/24; 260/75 NT; 260/77.5 TB; 260/858
[58] Field of Search ............... 260/24, 77.5 TB, 858, 260/75 NT

[56] References Cited

U.S. PATENT DOCUMENTS

| | | | |
|---|---|---|---|
| 2,826,526 | 3/1958 | Meyrick | 260/859 R X |
| 3,437,622 | 4/1969 | Dahl | 260/24 |
| 3,681,277 | 8/1972 | Scholz et al. | 260/24 |
| 3,723,372 | 3/1973 | Wakimoto | 260/77.5 TB X |
| 3,914,484 | 10/1975 | Creizon et al. | 260/858 X |
| 3,935,144 | 1/1976 | Hozenweiles et al. | 260/858 X |
| 4,007,215 | 2/1977 | Hartmann et al. | 260/77.5 TB X |

Primary Examiner—Sandra M. Person
Attorney, Agent, or Firm—Keil, Thompson & Shurtleff

[57] ABSTRACT

Pressure-sensitive adhesives are manufactured by reacting a mixture of a from 10 to 90% by weight of a polyol having a molecular weight of from 300 to 8,000 and a hydroxyl number of from 20 to 85 and b from 5 to 60% by weight of an amorphous thermoplastic tackifier resin having a softening point of from 40° to 140° C and a molecular weight of from 200 to 7,500, with c from 5 to 30% by weight of a polyisocyanate masked with CH-acidic compounds, the percentages by weight being based on the total weight of components (a), (b) and (c).

7 Claims, No Drawings

MANUFACTURE OF PRESSURE-SENSITIVE ADHESIVES

This invention relates to pressure-sensitive adhesives of polyols, tackifier resins and masked polyisocyanates and to a process for the manufacture of such products in which the use of solvents is not necessary.

It is known that adhesive compositions of rubber or phenolic resins may be spread without the use of solvents (see for example German Pat. No. 748,487 and Kunststoffe 54 (1964), pp. 381 et seq.). It has also been proposed to prepare pressure-sensitive adhesive compositions from one or more polyols having at least 3 hydroxyl groups per molecule, optionally di- and/or mono-ols and polyisocyanates. In such a process, the starting materials are reacted in such amounts that all of the hydroxyl groups of the polyols and, if used, di- and/or mono-ols react with the isocyanate groups of the polyisocyanates to form a completely crosslinked polyurethane. The resulting polyurethanes have an average chain length of from 130 to 285 chain atoms (cf. U.K. Pat. No. 1,113,925). Such adhesive compositions, which contain no tackifier resins, cure very slowly. Another disadvantage is that these adhesive compositions which are hard and of the consistency of rubber at room temperature, can only be spread in a softened state, i.e. at relatively high temperatures. However, complicated and expensive equipment is necessary to transport hot tacky compositions in the machine to the means of application, which must be kept hot throughout. For this reason, processes of this kind have not assumed any industrial significance.

According to U.S. Pat. No. 3,437,622, a mixture of polyols, polyisocyanates and up to 10% by weight of a tackifier resin, based on the weight of the polyol used, is heated to 100° C to form an isocyanate-containing prepolymer which is dissolved in an inert solvent. The adhesive-containing solution is spread onto a substrate and the solvent is then evaporated. The prepolymers are thus converted to the polyurethane polymers useful as adhesives. This process has the drawback that it is not possible to mix in relatively large amounts of resin in such systems and the prepolymers can only be processed in the form of solutions.

Solvent-containing adhesive compositions of isocyanates and esters of castor oil and carboxylic acids are described in U.S. Pat. No. 3,246,049. The adhesive compositions are dissolved in nonpolar solvents such as xylene and applied to the substrate. This method is also very expensive and often time-consuming, since the solvent must be removed under vacuum after application of the composition.

German Published Application No. 2,002,457 reviews a process for the manufacture of pressure-sensitive adhesives of hydroxyl-containing polyalkylene ethers, tackifier resins and aliphatic or aromatic polyisocyanates. In this method, the starting materials are mixed without the addition of conventional inert solvents and are applied to the substrate without the use of solvents. The drawback of this process is that the adhesives can only contain a maximum of 30% by weight of a tackifier resin. If the resin content is higher, the adhesive loses some of its tack after a few days or weeks due to segregation of its components or the viscosity of the adhesive rises to such an extent that the product can no longer be processed on conventional metering and conveying equipment. Since the adhesiveness depends on the content of tackifier, it is advantageous in a number of applications to incorporate relatively large amounts of tackifier in such products.

The adhesive compositions based on polyurethane hitherto known are two-component systems or, as in the case of U.S. Pat. No. 3,437,622, a single-component system of insufficient storage stability. Processing must be carried out within a limited time and it is therefore necessary to take special precautions in handling due to the fact that such systems may readily gel in pipelines and coating equipment. Furthermore, such systems are sensitive to air and moisture.

It is an object of the present invention to provide stable pressure-sensitive adhesives which are easy to handle and have good adhesiveness and a relatively low viscosity and which can be rapidly spread onto substrates with conventional conveying and coating equipment without the addition of inert solvents and which show no tendency to gel even at temperatures of about 80° C but very rapidly crosslink at temperatures above about 100°.

We have now found that pressure-sensitive adhesives having these advantageous properties may be prepared by mixing a. from 10 to 90% by weight of a polyol having a molecular weight of from 300 to 8,000 and a hydroxyl number of from 20 to 85 and b. from 5 to 60% by weight of an amorphous, thermoplastic tackifier having a softening point of from 40° to 140° C and a molecular weight of from 200 to 7,500 and reacting the mixture with c. from 5 to 30% by weight of a polyisocyanate masked with CH-acidic compounds, the percentages being based on the weight of components (a), (b) and (c) together. The above molecular weights are those measured osmometrically using a vapor pressure osmometer, particularly with the use of acetone as solvent in a conventional Mechrolab vapor pressure osmometer.

Our novel adhesives may be prepared and processed without the addition of conventional inert solvents and show high tack in addition to the above advantageous properties.

The use of masked polyisocyanates as isocyanate component increases the viscosity of the reaction mixture only insignificantly when the starting materials are mixed, which means that relatively large amounts of tackifier may be incorporated in the adhesive if desired. Furthermore, metering fluctuations in the preparation of the adhesive reaction mixture are less detrimental to the properties of the product than when conventional non-masked polyisocyanates are used. Thus the adhesives and the tack and also the properties of the adhesive tapes coated with the adhesives are easy to reproduce on an industrial scale. Another advantage is that, unlike conventional polyisocyanates, the masked polyisocyanates are not sensitive to moisture, which means that the reaction taking place between the polyol/tackifier mixture and the masked isocyanates is not impaired by atmospheric moisture and moisture in the substrate. Moreover, masked polyisocyanates exhibit virtually no vapor pressure and therefore involve no physiological hazards and are environmentally acceptable.

Suitable starting materials (a) for the preparation of the pressure-sensitive adhesives are polyols, for example polyesterols and, preferably, polyetherols, which polyols may be linear and/or branched-chained and have molecular weights of from 300 to 8,000 and in particular from 900 to 6,000 and preferably from 1,800 to 5,200. Examples of suitable polyetherols are those which may be prepared by polyalkoxylation of dihydric or polyhydric and preferably di- and/or trihydric alkanols such as ethylene glycol, propylene glycol, butanediol-1,3, butanediol-1,4, trimethylolpropane and glycerol with ethylene oxide and/or propylene oxide. Mixtures of different hydroxyl-containing polyalkylene oxides may also be used, for example those prepared from alkanol mixtures by the addition of ethylene oxide and/or propylene oxide. The polyetherols possess OH numbers of from 20 to 85 and in particular of from 25 to 70 and preferably from 30 to 50.

Other suitable starting materials (a) are polyesterols having OH numbers of from 20 to 85 and preferably of from 35 to 50. They are usually prepared from aliphatic and/or aromatic dicarboxylic acids, such as phthalic acid and terephthalate acid and preferably from succinic acid, glutaric acid, adipic acid, pimelic acid and sebacic acid, and di- and/or tri-alkanols such as glycol, ethylene glycol, butanediol-1,4, butanediol-1,3, hexanediol-1,6, trimethylolpropane and glycerol, at elevated temperatures in the presence or absence of catalysts such as titanium salt or alcoholates. Particularly suitable are those polyesterols which have an acid number of less than 3.

Also suitable as starting materials (a) for the manufacture of pressure-sensitive adhesives are hydroxyl-containing acrylate copolymers having a molecular weight of from 1,500 to 8,000 and a pour point below +15° C. They preferably contain major amounts, i.e. usually more than 50% and in particular more than 70%, of acrylates of $C_{4-8}$ non-tertiary alkanols, particularly n-butyl acrylate, isobutyl acrylate, n-octyl acrylate, isooctyl acrylate and/or 2-ethylhexyl acrylate in the form of polymerized units. Particularly suitable hydroxyl-containing components which are contained therein in the form of polymerized units in amounts of preferably from 5 to 25% by weight, based on the weight of acrylate copolymer, are those derived from $C_{2-4}$ alkanediols such as ethylene glycol monoacrylate, ethylene glycol monomethacrylate, butanediol-1,4-monoacrylate, butanediol-1,4-monomethacrylate, 2-hydroxypropyl acrylate and 3-chloro-2-hydroxypropyl acrylate. These acrylate copolymers may also contain up to 20% of their weight and preferably from 5 to 15% by weight of polymerized units of other olefinically unsaturated monomers such as vinyl esters, e.g. vinyl acetate, vinyl propionate and vinyl n-butyrate, vinylaromatic monomers such as, in particular, styrene, α-methylstyrene and/or vinyltoluenes, nitriles of α,β-olefinically unsaturated mono- and/or di-carboxylic acids usually containing from 3 to 5 carbon atoms, such as acrylonitrile, and also acrylates of tertiary alkanols such as t-butyl acrylate and t-butyl methacrylate and, in amounts of usually from 1 to 3% by weight, α,β-monoolefinically unsaturated mono- and/or dicarboxylic acids and/or their amides such as acrylic acid, methacrylic acid, maleic acid, itaconic acid, fumaric acid, acrylamide, methacrylamide, maleic monoamide and itaconic diamide. The average molecular weight of such copolymers, as measured with a Mechrolab vapor pressure osmometer in acetone, is preferably from 2,000 to 5,000 and the pour point is generally between −15° and +15° C, as determined according to DIN 51583 or ASTM D 97/57. Preparation of such acrylate copolymers is preferably effected in the absence of solvents by polymerization in the presence of free-radical catalysts, particularly azobiscarboxamides and azobiscarboxylic nitriles, e.g. azodiisobutyronitrile, and/or peroxides such as t-butyl peroxide, at temperatures of from 120° to 160° C, and in particular from 120° to 140° C, in the presence of conventional chain stoppers. Suitable chain stoppers, which are generally used in amounts of from 0.5 to 3% and preferably from 1 to 2% by weight of monomers, are for example t- or n-dodecylmercaptan, thioethanol and diisopropylxanthogen disulfite. Polymerization is preferably carried out under reduced pressure, usually a pressure of 0.2 to 0.8 bar and preferably from 0.4 to 0.6 bar, for at least a portion of the reaction time, and the reaction mixture is preferably cooled by evaporative cooling, i.e. under reflux of monomers and/or solvents.

Mixtures of different polyols may also be used as starting materials (a) for the preparation of the adhesives.

The tackifiers (b) are solid, amorphous, hard to brittle, thermoplastic materials having softening points between 40° and 150° C and preferably between 75° and 135° C and generally having an average molecular weight of from 200 to 7,500 and preferably from 500 to 1,500. The tackifiers must be compatible with the polyol, i.e. they should be capable of being mixed with the polyols on heating to temperatures above the softening point of the tackifier and the polyol/tackifier mixture must not show segregation of its components at room temperature.

Suitable components (b) are for example natural resins and modified natural resins such as terpene resins (also known as polyterpene resins), balsam resins, rosins such as rosin itself, hydrogenated rosin, esters of rosin or of hydrogenated rosin, for example the glycerol esters, pentaerythritol esters, ethylene glycol esters, diethylene glycol esters, methyl esters and propyl esters of rosin or hydrogenated rosin. Also suitable are esters of the hydroabietyl alcohol formed on complete hydrogenation of rosin, for example the benzoic acid or phthalic acid esters thereof. Other good tackifiers (b) are the conventional terpene phenol resins, alkylphenol resins, ketone resins such as condensates of cyclohexanone, coumarone resins, indene resins, hydrocarbon resins such as isobutylene/styrene copolymers, polyvinyl isobutyl ethers, polyvinyl acetates, vinyl acetate/vinyl laurate copolymers and polyolefins.

Of the suitable tackifiers, those are preferred which have an acid number of less than 100 and preferably one of from 0 to 70, e.g. terpene resins, terpene phenol resins and ester resins. It is particularly advantageous to use mixtures of different tackifiers (b), for example mixtures of 2 to 4 different resins. Where a mixture of resins of different softening points is used, for example a mixture of resins having softening points at about 70° C and resins having softening points at about 120° C, the resulting adhesives may be used over a larger temperature range than is the case with adhesives based on only one resin.

The starting materials (c) are adducts, i.e. reaction products of CH acidic compounds and polyisocyanates. Examples of masking agents, i.e. CH acidic compounds, are malonic esters, such as diethyl malonate, ethyl acetoacetate, malonic dinitrile, acetyl acetone, methylene disulfone, dibenzoyl methane, dipivalyl methane and dimethyl acetone dicarboxylate.

Particular examples of polyisocyantes are diisocyanates such as 3-isocyanatomethyl-3,5,5-trimethyl-cyclohexyl isocyanate (known by the trivial name of isophorone diisocyanate), 2,2,4- or 2,4,4-trimethylhexamethylene diisocyanate, diisocyanatomethylcyclohexane, dicyclohexylmethane diisocyanate, hexamethylene diisocyanate, toluylene diisocyanates such as 2,4-toluylene diisocyanate, diphenylmethane diisocyante and phenylcyclohexylmethane diisocyanate. Suitable tri- and tetra-isocyanates are for example tris-(4-isocyanatophenyl) thiophosphate, 4,4',4'''-triisocyanatotriphenylmethane, biurets based on, say, hexamethylene diisocyanate, and adducts of 1 mole of trimethylolpropane and 3 moles of 2,4-toluylene diisocyanate.

Preferred masked diisocyanates are those based on isophorone diisocyanate and malonic esters such as, in particular, diethyl malonate, these generally being derived from $C_{1-4}$ alkanols, or acetyl acetates of $C_{1-4}$ alkanols such as, in particular, ethyl acetoacetate.

The masked polyisocyanates may be prepared by known methods, for example as described by S. Petersen in Liebigs Annalen der Chemie 562, pp. 205 to 229 (1949). Examples of catalysts which may be used for the reaction between CH acidic compounds and polyisocyanates are small amounts of sodium or a concentrated sodium methoxide solution.

Components (a) and (c) are preferably used in proportions such that there are present, per equivalent of hydroxyl group of the polyols, i.e. per hydroxyl group of component (a), from 0.6 to 1.4 and preferably from 0.8 to 1.2 and more preferably from 0.8 to 0.98 equivalent isocyanate groups of the masked polyisocyanate, i.e. masked isocyanate groups of component (c). This leads to adhesives that may contain free hydroxyl groups, which may be an advantage in many applications.

The reaction of polyols with the adduct (c) produces products showing a certain tackiness, but these do not constitute advantageous adhesives.

The three starting components polyol (a), tackifier (b) and masked polyisocyanate (c) are used in the following proportions:

component (a): from 10 to 90% and preferably from 30 to 70%, by weight,
component (b): from 5 to 60% and preferably from 25 to 50%, by weight, and
component (c): from 5 to 30% and preferably from 5 to 20%, by weight.

The quality of the adhesive depends on the conditions used in preparing and processing the product. For example, good products are obtained by mixing, in a first stage, the tackifier and the polyol at temperatures above the softening point of the tackifier, particularly at temperatures ranging from 40° to 160° C, and adding, in a second stage, the masked polyisocyanate at temperatures below 100° C and preferably at from 50 to 80° C. This mixture is then shaped whilst still fluid, which shaping includes application to sheeting or any other substrate, usually of a flat nature. Following shaping, the crosslinking reaction is carried out at temperatures above 100° C, usually at from 110° to 180° C and preferably from 120° to 160° C. After cooling to room temperature there is obtained a soft adhesive, i.e. a pressure-sensitive adhesive composition or adhesive coating.

The adhesives are prepared, for example, in the following manner: the polyol, preferably having a water content of less than 0.1% of its weight, is mixed with the resin or resin mixture in such a manner as to give a homogeneous polyol/resin mixture. To this end, the components are usually heated, with stirring to temperatures above the softening point of the resin, for example to from 40° to 160° C, until a clear homogeneous mixture is formed. Depending on the nature of the polyol and the nature and amount of tackifier used, the resulting mixture has a viscosity, at room temperature, of from about 2,000 to 50,000 mPa.s.

If no resin (b) or less than 5% by weight thereof is used, the tackiness of the product is unsatisfactory. Adhesives containing more than 60% by weight of a resin (b) have very good tack but the products, on account of the increasing viscosity, can only be processed at elevated temperatures, for example temperatures of above 50° C.

Following cooling of the resin/polyol mixture, the masked crosslinking agent is added at a temperature at which the masked polyisocyanate may be readily worked into the mixture, for example at about 80° C in the case of the diethyl malonate/isophorone diisocyanate adduct. Other conventional auxiliaries such as dyes, fillers, pigments, plasticizers, aging retardants, antioxidants, light stabilizers, reactive diluents, desiccants, wetting agents and, optionally, solvents may be added. It is also possible to add conventional catalysts to accelerate the subsequent reaction of the hydroxyl groups with isocyanate groups. Examples of suitable catalysts for this purpose are dibutyl tin dilaurate and tin(II) octoate and also tertiary amines such as triethylene diamine or mixtures of said materials. These catalysts are advantageously added after the addition of the masked polyisocyanates.

Shaping may be effected by methods such as are conventionally used in the preparation of self-adhesive products.

The adhesive may be used in the form of a relatively thick layer. The main field of application is the manufacture of adhesive tapes, adhesive sheeting and adhesive labels, in which case the adhesive is applied as a thin layer to a fabric or web of, say, paper, cellulose, cellulose acetate, cellophane, polyesters such as polyethylene glycol terephthalate polyamides such as polycaprolactam, polyvinyl chloride and polyolefins such as polyethylene and polypropylene and polystyrene. The layer thickness is generally above 5 $\mu$ and advantageously above 25 $\mu$ and less than 200 $\mu$, this being equivalent to rates of application of more than 5 g and advantageously more than 25 g per m² and less than 200 g per m².

Following shaping or application of the adhesive mixture, this is allowed to react to completion at temperatures above the dissociation temperature of the masked polyisocyanate. The viscosity of the mixture then increases rapidly and the mixture soon gels and solidifies to form a soft elastic mass having excellent adhesive properties. If, after application, the composition is heated for a brief period to temperatures of about 100° to 200° C, depending on the isocyanate adduct used, the composition solidifies within a few minutes and the coated sheeting can be wound up, if necessary after insertion of a parting sheet, for example a polyethylene tetrafluoride sheet or wax paper.

The adhesive is also highly suitable for the manufacture of self-adhesive sealing compositions and insulations, such as may be used in the building industry for sealing joints.

It is not necessary for a catalyst to be present to cure the adhesive after processing, but the presence of such a catalyst can shorten the curing time and lower the curing temperature.

Where it is desired to prepare adhesives having a high resin content, it is possible to use plasticizers such as phthalates, e.g. benzyl n-butyl phthalate, in amounts of from 5 to 30%, by weight of the total weight of components (a), (b) and (c).

To assess the adhesive properties of flat structures coated with out novel adhesives, polyester sheets are coated, in the following examples, with solvent-free adhesive in such a manner that the coating has a thickness of 30 μ (equivalent to a weight of application of 30 g/m²). Test strips having a width of 2 cm are cut from the coated sheets and these strips are stored in a conditioning chamber for 24 hours at 20° C and a relative humidity of 65%. The peeling strength is determined by the peeling test, the shear strength by the shear test and the tack by the probe tack test as follows:

In the peeling test, the test specimens are stuck to a chromium-plated panel and are peeled therefrom in a direction parallel to the adhesive layer, i.e. at an angle of 180° C, the force required being measured. The rate of peel is 300 mm/min., the measurement being carried out 24 hours after the strips have been stuck to the chromium-plated substrate.

The shear test is carried out to give a measure of the cohesion of the adhesive layer. In this case the test strips are pressed onto a highly polished chromium plated panel having an area of 20×25 cm, the free end of the test strips being loaded with a weight of 1,000 g with the panel suspended vertically. The time is measured until the bond brakes under the constant tension of 1,000 g. The measurement is carried out at 20° C and at 50° C.

Determination of tack is effected using a Polyken probe tack tester such as is described in Special Technical Publication No. 360 of ASTM (1963), the contact time being 0.2 sec. the rate of withdrawal being 2 cm/sec and the weight used being 20 g/cm².

In the following Examples the parts and percentages are by weight.

EXAMPLE 1

A mixture of
100 parts of a trifunctional polyethylene polypropylene etherol (mean molecular weight 4,500, hydroxyl number 36) and
50 parts of terpene rosin (melting range 117° to 130° C)
is heated under reduced pressure to a temperature of 135° C, during which process it is intimately mixed and dehydrated. The mixture is then allowed to cool to 80° C, whereupon
17.7 parts of an adduct of 1 mole of isophorone diisocyanate and 2 moles of diethyl malonate and
0.72 part of tin (II) octoate
are added.

A polyester sheet is coated with 30 g/m² of this adhesive composition. Curing is effected for from 1 to 2 minutes at 120° C to give a self-adhesive sheet having the following adhesive values:

| peeling strength | 500 g |
|---|---|
| shear strength at 20° C | more than 24 hours |
| shear strength at 50° C | more than 24 hours |
| probe tack | 1,400 g/cm² |

EXAMPLE 2

Example 1 is repeated except that 16.5 parts of an adduct of 1 mole isophorone diisocyanate and 2 moles of ethyl acetoacetate are used in place of the masked polyisocyanate mentioned in Example 1. After curing for 2 minutes at 170° C, the following adhesive values are obtained.

| Peeling strength | 300 g |
|---|---|
| shear strength at 20° C | more than 24 hours |
| shear strength at 50° C | more than 24 hours |
| probe tack | 1,200 g/cm² |

EXAMPLE 3

A mixture of
100 parts of a polypropylene etherol (average molecular weight 2,000, hydroxyl number 56),
30 parts of the phthalate of hydroabietyl alcohol (melting range 60° to 70° C),
27.5 parts of an adduct of 1 mole of isophorone diisocyanate and 2 moles of diethyl malonate, and
0.5 part of tin(II) octoate
30 is prepared and reacted as in Example 1. The adhesive is tested as described above to give the following results:

| peeling strength | 700 g |
|---|---|
| probe tack | 1,700 g/cm² |

EXAMPLE 4

75 parts of a copolymer of 90% by weight of n-butyl acrylate and 10% by weight of butanediol-1,4 monoacrylate having an average molecular weight of 2,500 and a pour point of −2° C are heated with 17.2 parts of a commercial terpene phenol resin having a softening range of from 63° to 70° C (measured according to DIN 53,180) under reduced pressure to 100° C to be intimately mixed and dehydrated. The mixture is then allowed to cool to 80° C and
14.3 parts of an adduct of 1 mole of isophorone diisocyanate and 2 moles of diethyl malonate and
0.8 part of tin(II) octoate
are added.

Polyester sheeting is coated with the adhesive composition at a rate of 30 g/m². Curing is effected for from 1 to 3 minutes at 120° C to give a self-adhesive sheet having the following tack values:

| Peeling strength | 500 g |
|---|---|
| shear strength at 20° C | more than 24 hours |
| shear strength at 50° C | more than 24 hours |
| probe tack | 1,600 g/cm² |

EXAMPLE 5

70 parts of an 80:10:10 copolymer of n-butyl acrylate/styrene/hydroxypropyl acrylate (average molecular weight 3,500, pour point + 12° C),
10 parts of a commercial polypropylene etherol (average molecular weight 4,500, hydroxyl number 36),
15 parts of a commercial terpene phenol resin (softening range 63 to 70° C),
16.6 parts of an adduct of 1 mole of isophorone diisocyanate and 2 moles of diethyl malonate and
1 part of tin(II) octoate.

In all other respects the process is carried out as in Example 1 to give the following tack values:

| | |
|---|---|
| peeling strength | 600 g |
| shear strength at 20° C | more than 24 hours |
| shear strength at 50° C | more than 24 hours |
| probe tack | 1,850 g/cm². |

We claim:

1. A process for the manufacture of pressure-sensitive adhesive, in which
   a. from 10 to 90% by weight of a polyol having a molecular weight of from 300 to 8,000 and a hydroxyl number of from 20 to 85 and
   b. from 5 to 60% by weight of an amorphous, thermoplastic tackifier having a softening point between 40 and 140° C and a molecular weight between 200 and 7,500, are mixed together and the mixture is reacted with
   c. from 5 to 30% by weight of a polyisocyanate masked with CH acidic compounds, the percentages being based on the total weight of components (a), (b) and (c).

2. A process for the manufacture of pressure-sensitive adhesives, in which
   a. from 30 to 70% by weight of a polyol having a molecular weight of from 1,800 to 5,200 and a hydroxyl number of from 25 to 70 and
   b. from 25 to 50% by weight of an amorphous, thermoplastic tackifier having a softening point between 40° and 140° C and a molecular weight between 200 and 7,500 and an acid number below 100 are mixed together and the mixture is reacted with
   c. from 5 to 20% by weight of a reaction product of a CH acidic compound selected from the group consisting of acetyl acetates of $C_{1-4}$ alkanols and malonates of $C_{1-4}$ alkanols with isophorone diisocyante, the percentages being based on the total weight of components (a), (b) and (c).

3. A process as claimed in claim 2, wherein the polyol (a) used is a polyetherol having a hydroxyl number of from 30 to 50.

4. A process as claimed in claim 2, wherein the polyol (a) used is a polyesterol having a hydroxyl number of from 35 to 50.

5. A process as claimed in claim 2, wherein the polyol (a) used is a hydroxyl-containing acrylate copolymer having a molecular weight of from 2,000 to 5,000.

6. A process as claimed in claim 2, wherein the mixture of components (a) and (b) is reacted with components (c) at from 110° to 180° C, from 0.6 to 1.4 masked isocyanate groups of component (c) being used for every hydroxyl group of component (a).

7. A process as claimed in claim 2, wherein the components (a) and (b) are mixed at from 40° to 160° C, the component (c) is added at from 50° to 80° C and the resulting mixture is shaped and heated to from 110° to 180° C.

* * * * *